Jan. 22, 1957 W. R. EVANS 2,778,689
CURING OF THE BRISTLE-BONDING AGENTS IN BRUSHES
Filed Jan. 30, 1953 3 Sheets-Sheet 1

INVENTOR.
WILLIAM R. EVANS
BY
Oscar L. Spencer
ATTORNEY

Jan. 22, 1957  W. R. EVANS  2,778,689
CURING OF THE BRISTLE-BONDING AGENTS IN BRUSHES
Filed Jan. 30, 1953  3 Sheets-Sheet 2
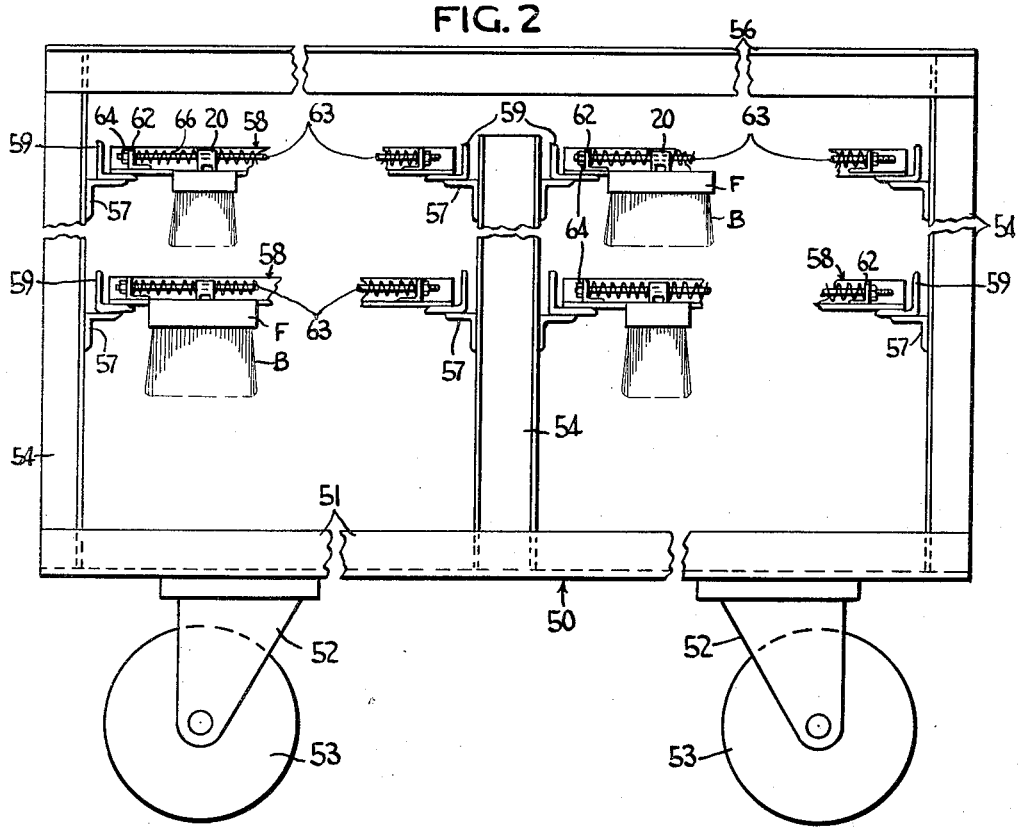
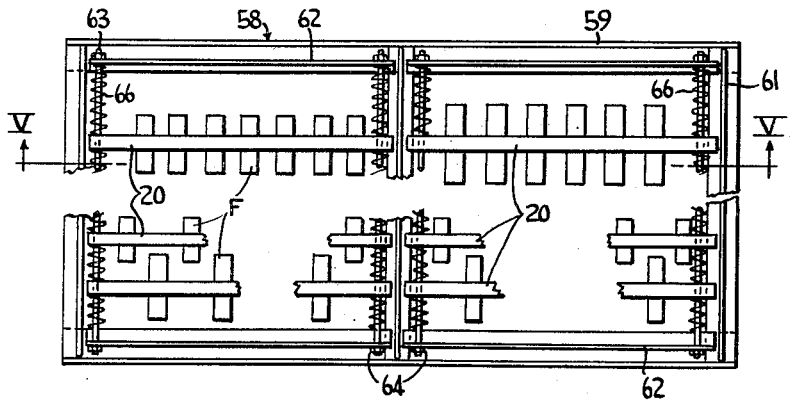
INVENTOR.
WILLIAM R. EVANS
BY
Oscar L Spencer
ATTORNEY Jan. 22, 1957 W. R. EVANS 2,778,689
CURING OF THE BRISTLE-BONDING AGENTS IN BRUSHES
Filed Jan. 30, 1953 3 Sheets-Sheet 3

INVENTOR.
WILLIAM R. EVANS
BY
Oscar L. Spencer
ATTORNEY

United States Patent Office 2,778,689
Patented Jan. 22, 1957

2,778,689
CURING OF THE BRISTLE-BONDING AGENTS IN BRUSHES

William R. Evans, Baltimore, Md., assignor to Pittsburgh Plate Glass Company, Pittsburgh, Pa., a corporation Application January 30, 1953, Serial No. 334,287

5 Claims. (Cl. 300—21)

This invention relates to a method of curing bonding agents about the butt portions of the bristles in brushes such as are used in applying paints, varnishes, lacquers, enamels and such like coating media and it has particular relation to a process of curing the bonding agent about the butts of the bristles of a brush in a metallic ferrule adapted for securing the bristles to the handle of a brush.

Objects of the invention comprise supporting the brush bristle portions during the curing operation in such manner that:

(a) The curing operation is substantially speeded up;

(b) The curing operation can be effected without gumming the bristles and without requiring subsequent removal of the gumming agent;

(c) The brush bristle portions can be cured without packing them in trays;

(d) The brush bristle portions having the bonding agent poured in the ferrule thereof can be disposed for curing at maximum speed and with minimum effort.

This statement of objects is non-exclusive, involves no attempt to correlate the objects in any order of importance, and the several objects need not necessarily be attained simultaneously.

For a better understanding of the invention, reference may now be had to the accompanying drawings in which:

Figure 2 is a fragmentary side elevational view of an appropriate carrier for supporting the brush bristle portions during the curing operation.

Figure 4 is a fragmentary plan view of a supporting apparatus designed to support the brush bristle portions in the carrier during the curing operation.

Figure 5 is a sectional view taken on the line V—V of Figure 4.

Figure 1:
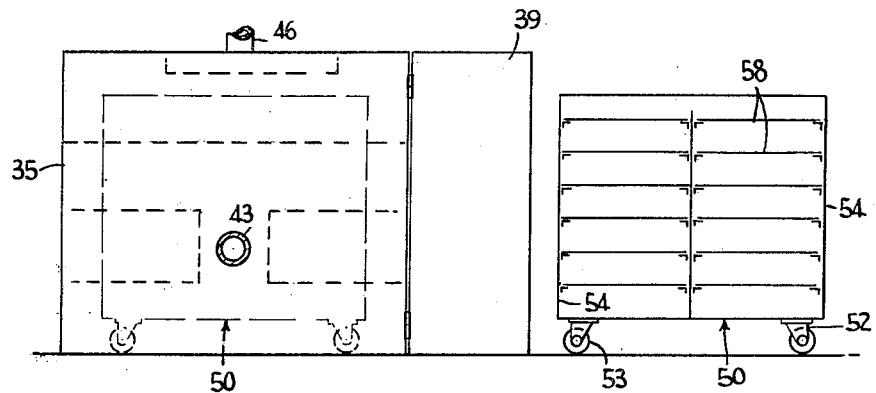
Figure 1 is a side elevational view of an appropriate embodiment of apparatus for use in the practice of the invention.

A common method of forming brush bristle portions, or bodies, comprises disposing masses of bristles suitable for forming the portions in bands of sheet iron or steel constituting ferrules, pouring an adhesive material such as a rubber cement upon the butt portions of the bristles in the ferrules and then curing the adhesive by application of heat. In effecting the curing operation, it is conventional preliminarily to stiffen the bristles by dipping them in a paste (such as a paste of linseed meal or flour) which paste is subsequently dried in order to give sufficient rigidity to the bristles to admit of their being stood on their tips in a pan for curing. The bristle portions or bodies with the cement in the ferrules are packed in the pan sufficiently tight that they will stand on their tips in vertical position, each being supported from falling over by adjacent ferrules. Naturally, the packing operation requires a considerable amount of time and effort. The pans, after packing with bristle portions containing a cementing material in the ferrules, are disposed in ovens heated to an appropriate curing temperature and are there cured by contact with a heated gaseous medium which usually is circulated about the pans, but not between the bristle units. This type of curing operation is obviously slow because heat can only penetrate the closely packed bristle portions by conduction or by penetration from above, and requires about 12 hours to complete. At the conclusion of the curing operation the pans are withdrawn from the ovens, the bristle portions are unpacked and the dried paste material employed to stiffen the bristles is cleaned off by a combing or brushing operation. The many operations involved in preparing the brush bristle portions for curing and in removing the stiffening material at the conclusion of the curing operation are of necessity laborious and time-consuming.

The present invention comprises the provision of apparatus for curing brush bristle portions whereby the foregoing difficulties are obviated. More specifically, it comprises the provision of a system of magnetic bars arranged to support the brush bristle portions in an oven, during curing operations, in a suspended position by magnetic attraction upon the sheet iron or steel ferrules encasing the butt portions of the bristles. By use of such apparatus the necessity of stiffening the bristles by application of a paste is obviated, thus eliminating the operations of applying, drying and subsequently combing or brushing the dried paste from the cured bristle portions. The use of such apparatus also obviates the necessity of careful packing of the brush bristle portions in pans to assure maintenance of upright position. Moreover, the bristle portions can be suspended in the curing ovens with sufficient space between the units to admit circulation of heating gases both above and around the individual units, thus substantially increasing the rate of heating and curing the cementing materials in the ferrules. In fact, it has been found that in many, if not all instances brush bristle portions, when so supported, can be cured in approximately one-half the time employed to cure brush bristle portions by conventional methods.

Figure 7:
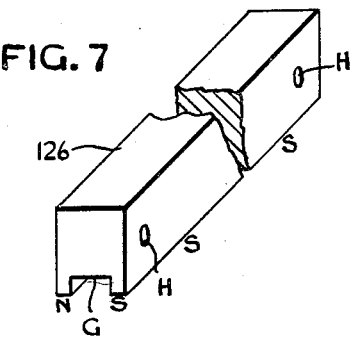
Figure 7 is an isometric view of a bar magnet designed for supporting the brush bristle sections in the supporting device as illustrated in Figures 4, 5 and 6.
Figure 8:
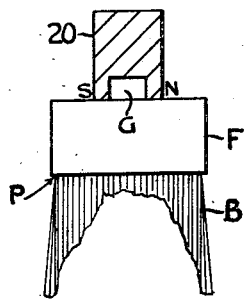
Figure 8 is an end elevational view of the bar magnet shown in Figure 7 illustrating a possible way in which it may be disposed to support brush bristle portions in operation.
Figure 9:
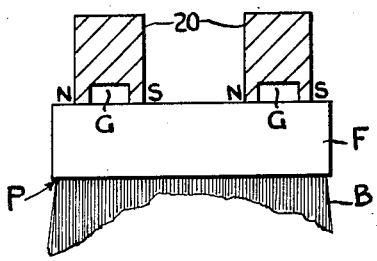
Figure 9 is an end elevational view of two bar magnets which are disposed to cooperate in supporting brush bristle portions of relatively large size.

Various forms of magnetic devices for supporting the brush bristle portions in the curing oven may be employed, but a preferred device comprises a magnetic bar of sufficient length to support a number of units simultaneously. One such device is illustrated in Figure 7 as a simple bar element 20 of an appropriate magnetic material of a permanent type. The material sold under the trade name of Alnico is representative of this material, and it is understood to be an alloy of aluminum, nickel and cobalt. The bars, preferably, are so magnetized that the poles (north and south or plus and minus) extend the entire length thereof, thus obviating the presence of a neutral zone in the midportion of the length of a bar. To this end, each bar is formed with a longitudinal slot or groove G along its lower face with lands on each side providing continuous, longitudinally extending poles N and S, disposed in side by side position as shown in Figures 7 and 8 so that both poles are brought into contact with the ferrules F of the brush bristle portions P having a bristle mass B. Said portions may be supported upon a single bar as indicated in Figure 8 in which the ferrules containing the bristle portions are brought into contact with the lower sides of the bars and are held there by the magnetic attraction of the bars for the metal. In the curing of larger units it may be desirable to support the ferrules by the magnetic attraction of a plurality of parallel bars appropriately spaced as indicated in Figure 9. The poles of the magnets, in this instance, may be disposed alternately north and south.

Figure 10:
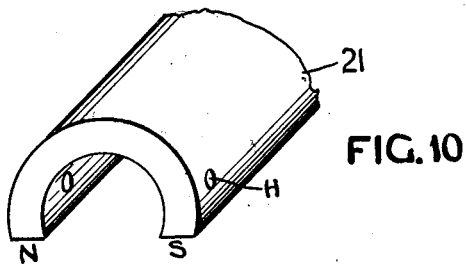
Figures 10 and 11 illustrate modified forms of bar magnets which, in the alternative, may be employed in supporting the brush bristle portion.

In the form of the invention illustrated in Figure 10, the bars 21 have an inverted U-like section with the edges constituting poles face downward so that a north and a south pole is brought into contact with the top of each ferrule.

Figure 11:
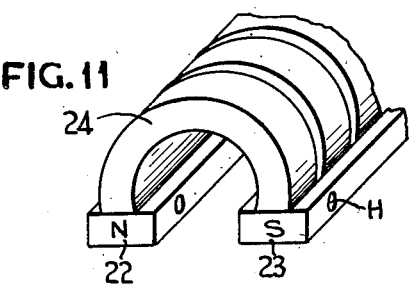

In the embodiment of the invention disclosed in Figure 11, a pair of bars 22 and 23 are provided and these constitute armatures for a series of permanent horseshoe magnets 24 which are disposed with their poles in contact with the bars, thus establishing a strong magnetic field adapted to support the ferrules of the brush bristle portions.

Figure 12:
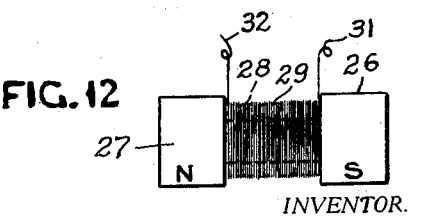
Figure 12 is an end elevational view of a bar magnet structure embodying electrical coils for maintaining the magnetic strength thereof.

In the embodiments of the invention just described, the magnets are of the permanent type and therefore do not require the use of electrical coils and holding currents to energize them. However, the invention also includes the use of electromagnets, one of which is illustrated in Figure 12. In this construction an iron bar, preferably of I-section, is provided and includes flanges 26 and 27 constituting poled pieces and being interconnected by a web portion 28 about which is disposed a coil 29 formed of conductive wire. The coil is provided with suitable conductive leads 31 and 32, by means of which electrical current can be introduced to energize the coil. It will be understood that in this embodiment of the invention, the pole pieces 26 and 27 and the web 28 are preferably formed of soft iron having a high degree of magnetic permeability.

Figure 3:
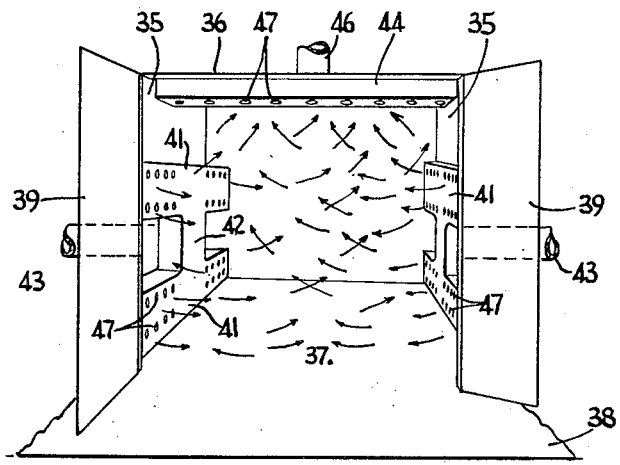
Figure 3 is a front elevational view illustrating an appropriate oven for conducting the curing operation.

The brush bristle portions P embodying bristle masses B and ferrules F, suitably supported by any of the magnetic devices illustrated in Figures 7 through 12, may be heated in order to effect curing of the bonding agent in the ferrules in substantially any appropriate oven. One such oven is illustrated in Figure 3 and includes side walls 35, a top 36 and a bottom 37, the latter of which is preferably approximately on a level with a floor 38 for a purpose which will be clear from the subsequent description. The oven is also provided with doors such as the swinging doors 39 whereby it may be closed for the retention of heat. In the interests of economy it is usually preferable to provide the several walls and the bottom of the oven with suitable thermal insulation (not shown).

A convenient mode of circulating gases for heating the oven comprises the provision of a system of ducts at the side walls thereof. Such ducts may comprise horizontal runs 41, interconnected by a vertical run 42 and having access to a source of heated gases through conduits 43. Gases may be exhausted from the oven through a header 44 connected by conduit 46 to an appropriate heating device (not shown) whereby the gases may be rewarmed and recirculated to the conduit 43 by fan means (not shown). It is to be understood that the conduits 41 and the header 44 are all provided with suitable openings 47 for the circulation of the gaseous medium indicated by the arrows in Figure 3.

For purposes of supporting the bar magnets and the brush bristle sections in the oven during the curing operation, any convenient device may be employed. In the embodiment of the invention herein shown, such means take the form of a carriage or truck 50 designed to travel on oven bottom 37 and floor 38. It is formed of angle irons and includes a base portion, or bottom frame 51 having caster forks 52 pivoted to rotate about vertical axes (not shown) in the frame and having wheels 53 journaled therein.

Vertical standards 54 in appropriate number, for example 3 to a side, are disposed upon the base 51 and are interconnected at their upper ends by a frame 56 which may be similar to the frame 51. These several frame elements are joined together at their points of intersection by any appropriate means, e. g. by bolts or by welding, as may be desired.

Angle irons 57 constituting guides and supports for magnet bar frames 58 extend transversely across the carriage and are secured to the vertical standards 54 at appropriate levels, for example by welding. Obviously, angle irons 57 may be secured at as many levels as may be desired dependent upon the lengths of the brush bristle sections to be vulcanized and the height of the oven available for performing the vulcanization operation.

The trucks or carriages may be of such dimensions that a single one will fill the oven to capacity. However, it will be apparent that they may also be formed to such size that a plurality thereof may be inserted simultaneously in the oven. Longitudinal tracks or guides may also be provided in the oven so that trucks may be run in at several levels. Likewise, it is a feature of the invention that a stationary frame provided with guides similar to guides 57. Frames similar to frame 58 may be slid directly thereupon without use of carriages or trucks.

Figure 6:
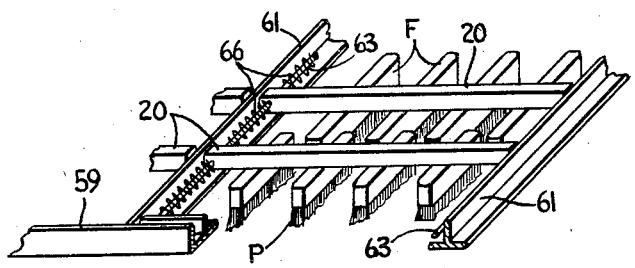
Figure 6 is a fragmentary isometric view of a portion of the apparatus shown in Figure 5.

For purposes of supporting the brush bristle sections in the carriages, removable frames 58 designed to slide upon and to rest upon the angle irons 57 may be provided. These frames are shown in detail in Figures 4, 5 and 6. The sides 59 of these frames preferably comprise angle irons or bars and the transverse sides 61 comprise bars of inverted T section. These several bars are secured together at their ends to form a rectangular frame by means of bolts or by welding. Angle bars 62 are also secured inside the frames in slightly spaced but parallel relationship with respect to the angle bars 59, and are bored at appropriate intervals to receive rods 63 extending longitudinally of the frame. The magnetic bars shown in Figures 7 through 13 are also provided with holes H which receive the rods, and thus to support the bars in the frame. Displacement of the rods is prevented by nuts 64.

For purposes of maintaining desired spacing of the magnetic bars 20 on the rods, short lengths of helical springs 66 are also disposed upon the rods, a section being inserted between each two magnetic bars and a section also being provided between the angle irons 59 constituting the sides of the frame and the outermost of the magnetic bars 20. These spring spacers are advantageous inasmuch as they automatically proportion the spacing between the several bars. Magnetic bars 20 may be inserted or removed from a frame and the spacing between the bars will be automatically equalized by the changes in compression in the springs.

In the operation of the apparatus herein disclosed, it will be assumed that the brush bristle bodies or portions have been assembled and a bonding agent such as a rubber cement or a thermosetting plastic is poured into ferrules F to desired depth. Paste need not be applied to the bristles. The brush bristle portions P containing the bonding material are attached in spaced, inverted position to the magnets 20 by merely contacting the upper edges of the ferrules with the lower faces of the bars. This operation can be performed with a minimum of effort and usually it is performed while the frames containing the magnetic bars are supported upon suitable apparatus outside of the truck or carriage structure 50. When a sufficient number of brush bristle units have been disposed upon the magnets of a frame, and while the truck or carriage is on floor 38 the frame is slid along the angle irons 57 until it assumes the position shown in Figure 2 of the drawing. The operation is repeated until the truck or carriage is filled to the desired degree. Subsequently, the carriage is pushed from floor 38 into the oven in the position shown in Figure 1 of the drawings. The doors 39 are closed and the hot gases at vulcanization temperature, namely, about 285° F., are circulated through the conduits 41 into the oven and are drawn out through the header structure 44 and the conduit 46 to appropriate heating apparatus (not shown). Subsequently they may be recycled. This operation is continued until the vulcanization or hardening of the bonding agent in the ferrules is completed. The time required, of course, will depend upon the temperature of the operation, which normally is selected sufficiently low as not to fuse or damage the brush bristles. For conventional rubber cements containing sulfur accelerators and the like, a period of about 6½ hours is sufficient, which constitues about half the time required to vulcanize the bristle bonding agents in conventional apparatus and at the same temperature.

The brush bristle portions, at the completion of the curing operation, are ready for the insertion of the handles which may be of conventional design and may be inserted and secured by conventional techniques. The brush bristle sections are ready for use and do not require further brushing or combing for purposes of removing a stiffening paste therefrom. Naturally the brush bristle tips may, if desired, be subjected to a buffing operation for further tapering and/or shaping the tips thereof.

While special mention has been made to the use of rubber cement in securing the brush bristles, it will be apparent that such cement may be replaced by other bonding agents, such as thermoplastic and thermosetting resins of various kinds which are adapted to be cured in the oven.

The forms of the invention herein described are to be considered as being by way of illustration. It will be apparent to those skilled in the art that numerous modification may be made therein without departure from the spirit of the invention or the scope of the claims.

I claim:

1. In the method of forming brush bristle portions, the steps of inserting bunches of brush bristles in ferrous metal ferrules, pouring a liquid bonding agent about the butts of the bristles in the ferrules, hanging the portions magnetically by their ferrules and with their tips downward and with a substantial space between contiguous portions and circulating a gaseous medium about and between the brush bristle portions at a temperature to effect curing of the bonding agent, until a substantial cure is effected.

2. A method of curing a bonding agent in a ferrous metal ferrule about the butts of the bristles of a brush bristle portion, comprising the steps of suspending the brush bristle portion tip downward magnetically by the ferrule and circulating a heated gas around the brush bristle portion in order to effect said cure.

3. A method as defined in claim 2 in which a series of brush bristle portions are supported in spaced relation with respect to each other.

4. In a method of curing a bonding agent about the butts of the bristles of a brush bristle portion in a ferrous metal ferrule without application of a stiffening paste to the brush bristles, the steps of suspending the brush bristle portion magnetically by a ferrule with the tips of the bristles pointed downwardly and curing the bonding agent about the butts of the bristles with the brush bristle portion in that position until the bonding agent binds said bristles.

5. The steps as defined in claim 4 in which there are a plurality of brush bristle portions disposed in spaced relationship with respect to each other, the curing operation being effected by circulating a heating gas about and between the brush bristle portions.

References Cited in the file of this patent

UNITED STATES PATENTS

| | | |
|---|---|---|
| 1,090,535 | Hill | Mar. 17, 1914 |
| 2,274,002 | Saltzman | Feb. 24, 1942 |
| 2,409,869 | Jones | Oct. 22, 1946 |
| 2,414,653 | Lookholder | Jan. 21, 1947 |
| 2,642,999 | McPherson | June 23, 1953 |
| 2,643,157 | Hardman | June 23, 1953 |
| 2,664,316 | Winslow | Dec. 29, 1953 |